(12) United States Patent
Sramek et al.

(10) Patent No.: US 11,990,740 B2
(45) Date of Patent: May 21, 2024

(54) APPARATUS FOR ELECTRICALLY INSULATING A LATERAL CONNECTING PORTION OF A LAMINATED MULTI-PHASE BUSBAR

(71) Applicant: ABB Schweiz AG, Baden (CH)

(72) Inventors: Martin Sramek, Palarikovo (SK); Libor Vitek, Namest nad Oslavou (CZ)

(73) Assignee: ABB Schweiz AG, Baden (CH)

( * ) Notice: Subject to any disclaimer, the term of this patent is extended or adjusted under 35 U.S.C. 154(b) by 125 days.

(21) Appl. No.: 17/870,974

(22) Filed: Jul. 22, 2022

(65) Prior Publication Data

US 2022/0360065 A1    Nov. 10, 2022

Related U.S. Application Data

(63) Continuation of application No. PCT/EP2020/051912, filed on Jan. 27, 2020.

(51) Int. Cl.
*H02G 5/00* (2006.01)
*H01B 13/06* (2006.01)
*H02B 1/20* (2006.01)

(52) U.S. Cl.
CPC ............ *H02G 5/005* (2013.01); *H01B 13/06* (2013.01); *H02B 1/20* (2013.01)

(58) Field of Classification Search
USPC ........................................................ 174/72 B
See application file for complete search history.

(56) References Cited

U.S. PATENT DOCUMENTS 3,202,756 A * 8/1965 Stanback ................. H02G 5/06
174/117 FF
3,384,856 A * 5/1968 Fisher ...................... H02G 5/08
174/68.2

(Continued)

FOREIGN PATENT DOCUMENTS

DE       102005015945 B4    7/2015
JP          2019-80484 A       5/2019

(Continued)

OTHER PUBLICATIONS

European Patent Office, International Search Report in International Patent Application No. PCT/EP2020/051912, 3 pp. (dated Oct. 12, 2020).

(Continued)

*Primary Examiner* — Krystal Robinson
(74) *Attorney, Agent, or Firm* — Leydig, Voit & Mayer, Ltd.

(57) ABSTRACT

An apparatus for electrically insulating a lateral connecting portion of a laminated multi-phase busbar comprises an elongated housing having first second housing sections made of an electrically insulating material that are pivotally connected to each other along a hinge section extending in a longitudinal direction of said housing and an opening arranged opposite to said longitudinal hinge section for receiving a connecting portion of a laminated multi-phase busbar. The first housing section comprises a plurality of first engagement structures and said second housing section comprises a plurality of second complementary engagement structures adapted to engage with said first engagement means when pivoting said first and second housing section towards each other from a first assembling position to a second clamping position.

10 Claims, 6 Drawing Sheets

(56) References Cited

U.S. PATENT DOCUMENTS

| | | | | |
|---|---|---|---|---|
| 3,726,988 | A * | 4/1973 | Davis | H02G 5/06 |
| | | | | 174/68.2 |
| 3,882,265 | A * | 5/1975 | Johnston | H01R 9/00 |
| | | | | 174/117 FF |
| 5,442,135 | A * | 8/1995 | Faulkner | H02G 5/007 |
| | | | | 174/68.2 |
| 7,102,256 | B2 * | 9/2006 | Murakami | H02G 5/005 |
| | | | | 174/117 FF |
| 9,270,091 | B2 * | 2/2016 | Erdle | H02B 1/202 |
| 2005/0082239 | A1 * | 4/2005 | Laurosch | H02B 1/20 |
| | | | | 312/265.4 |
| 2010/0025105 | A1 * | 2/2010 | Hirschfeld | H02B 1/20 |
| | | | | 174/72 B |

FOREIGN PATENT DOCUMENTS

| | | |
|---|---|---|
| WO | 2018/114690 A1 | 6/2018 |
| WO | WO 2019/201419 A1 | 10/2019 |

OTHER PUBLICATIONS

European Patent Office, Written Opinion in International Patent Application No. PCT/EP2020/051912, 5 pp. (dated Oct. 12, 2020).
European Patent Office, International Preliminary Report on Patentability in International Patent Application No. PCT/EP2020/051912, 7 pp. (dated Aug. 11, 2022).

* cited by examiner

APPARATUS FOR ELECTRICALLY INSULATING A LATERAL CONNECTING PORTION OF A LAMINATED MULTI-PHASE BUSBAR

CROSS-REFERENCE TO RELATED APPLICATIONS

This patent application claims priority to International Patent Application No. PCT/EP2020/051912, filed on Jan. 27, 2020, which is incorporated herein in its entirety by reference.

FIELD OF THE DISCLOSURE

The present disclosure is related to an apparatus for electrically insulating a lateral connecting portion of a laminated multi-phase busbar.

BACKGROUND OF THE INVENTION

Multi-phase busbars are used in low voltage switchgears to conduct and distribute alternating electrical current to different electrical devices which are installed in switch gear cabinets. In order to conduct all three or even more phases of an alternating current in a single busbar, laminated multi-phase busbars have been developed which comprise a base layer and a cover layer of electrically insulating material between which two or more layers of conducting sheet metal, in particular copper sheets, are arranged which are electrically insulated from each other by means of insulating intermediate layers.

An afore-described busbar in which the different layers are laminated to each other by means of liquid resin is described in DE 10 2005 015 945 B4 of the applicant. The described laminated multi-phase busbar has the advantage that it has a compact design and does not tend to delaminate due to repellant forces which are generated by the alternating electric currents which are conducted in the different conducting layers for each phase and which in case of a short circuit can be in the range of several thousand ampere (kA).

In order to supply electric energy from a power source to a laminated multi-phase busbar, it is known to remove the insulating material in a lateral section of the sandwich of layers and expand the uncoated conducting layers which project from the intermediate insulating layers, so as to provide for e.g. four lateral connecting portions, that is one for each phase and one for protective earth, to which the terminals of the electric power source can be connected.

The lateral connecting portions are also used to provide for an electrical connection between different busbars in two or more switch gear cabinets which are arranged in a row. Moreover, the lateral connecting portions serve to reduce the lengths of laminated busbars, as long busbars for large switchgear cabinets can be spilt up into a plurality of shorter busbar sections which are joint at the customer site, in order to ease handling and reduce transportation costs.

The electrical connection of the conducting layers of one busbar or busbar section to the conducting layers of an adjoining busbar or bus bar section at the lateral connecting portions is usually done by means of bridging elements each of which has two terminal members which are clamped to the contact sections of the conducting layers which are to be electrically connected. A bridging element for electrically interconnecting the connecting portion is disclosed in WO2018114690A1 of the applicant.

One problem of the afore-described laminated busbars is that the connecting portions of a busbar which are not used for interconnecting the same to a neighboring busbar or a power supply, must be electrically insulated when using the busbar, in order to avoid any risk of an electrical shock to operators, or sparking when energizing the busbar.

BRIEF SUMMARY OF THE INVENTION

In one aspect, the present disclosure provides an apparatus which allows for a cost efficient and reliable electrical insulation of the connecting portion of a laminated multi-phase busbar.

According to a disclosed embodiment, an apparatus for electrically insulating a lateral connecting portion of a laminated multi-phase busbar comprising comprises an elongated housing which is composed of a first and a second housing section each of which is made of an electrically insulating material like plastics, e.g. GPO-3 or another suitable sheet molding compound with insulating properties. The first and the second housing sections are pivotally connected to each other along a hinge section which extends in a longitudinal direction of the housing. The elongated housing has a length which in a preferred embodiment extends over the entire length of a lateral connecting portion of a laminated busbar.

BRIEF DESCRIPTION OF THE SEVERAL VIEWS OF THE DRAWING(S)

The embodiments of the disclosure are described with reference to the accompanying drawings.

Figure 1:
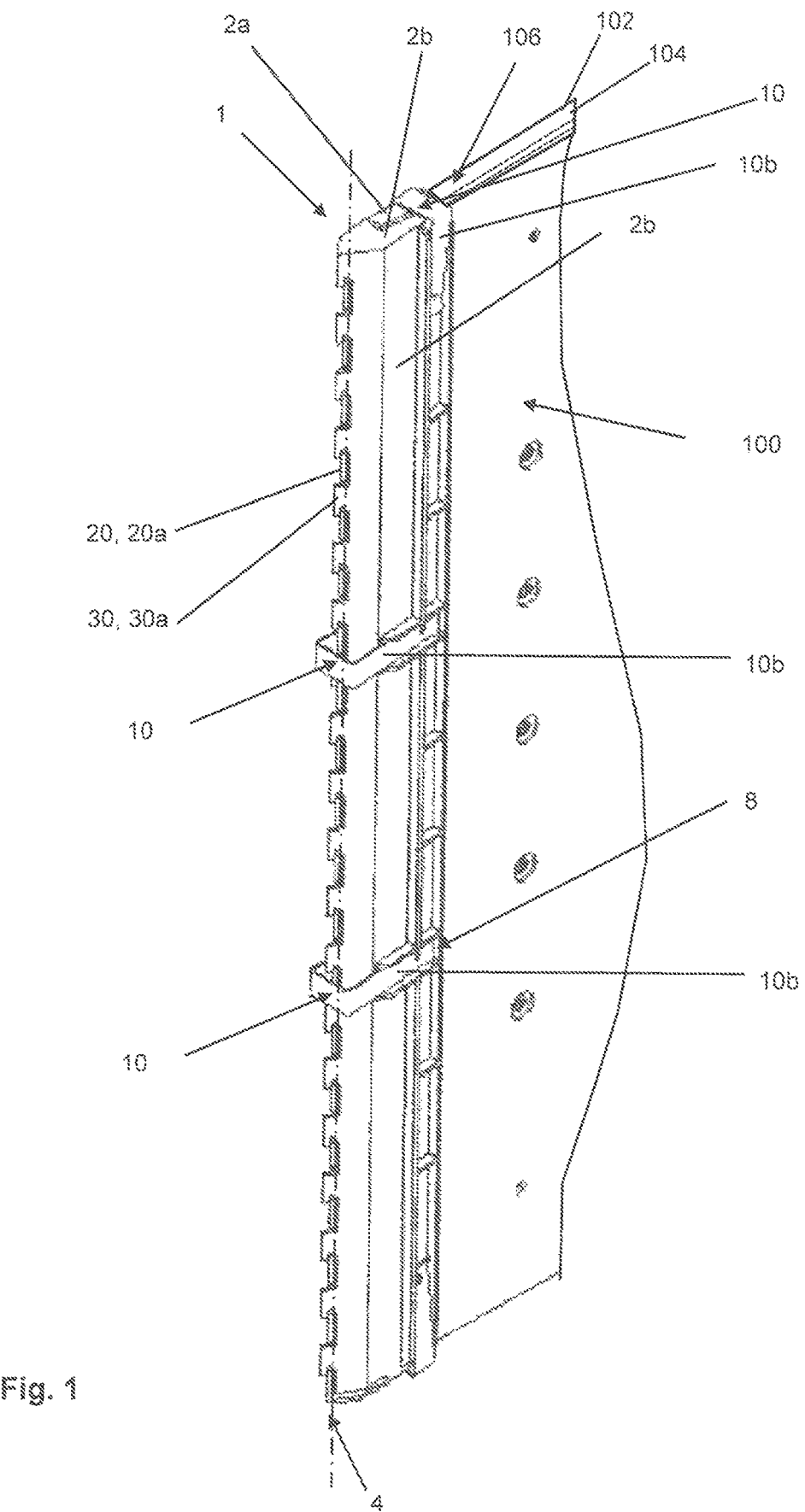
FIG. 1 is schematic view of a laminated multi-phase busbar with an apparatus according to the disclosure mounted thereat.
Figure 3A:
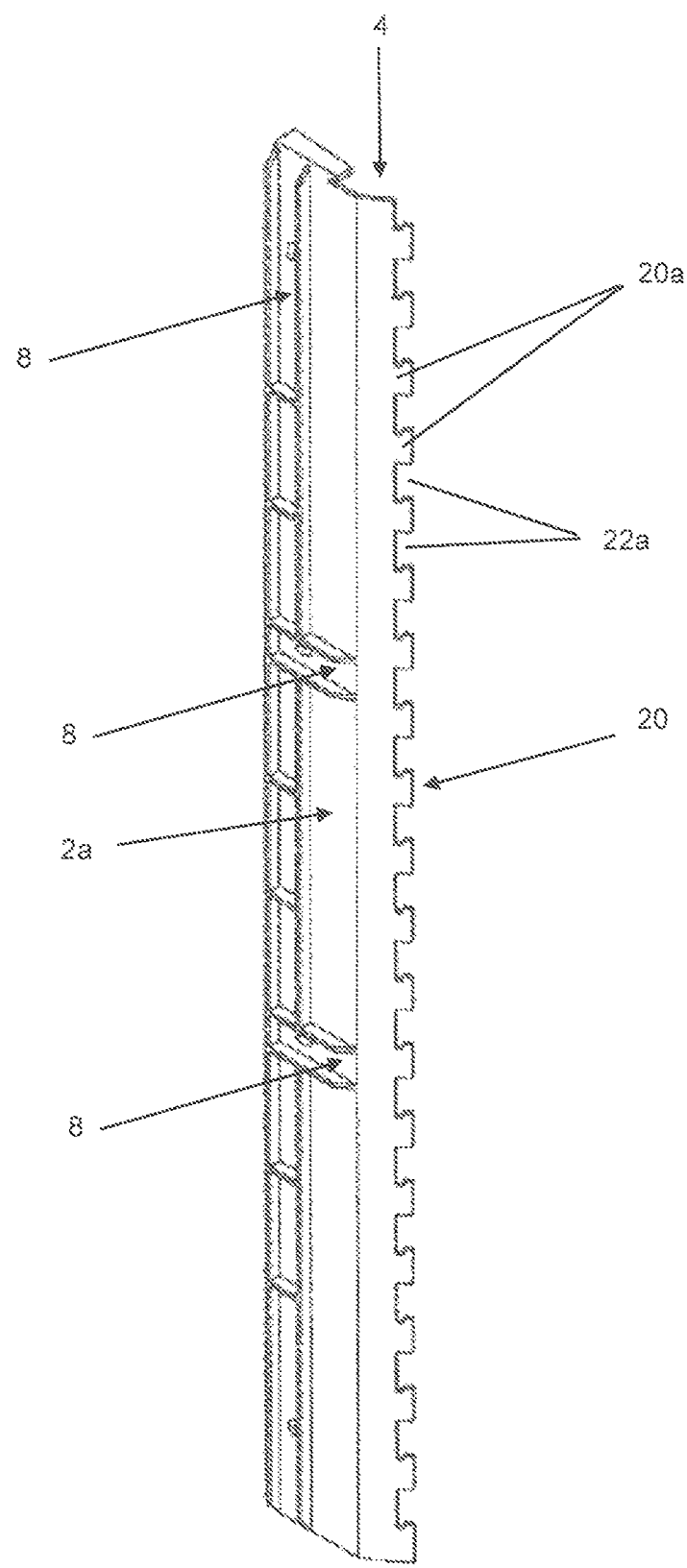

FIG. 3*a* is a 3-dimensional view of the outer side of the first housing section of the apparatus of FIG. 1.

Figure 3B:
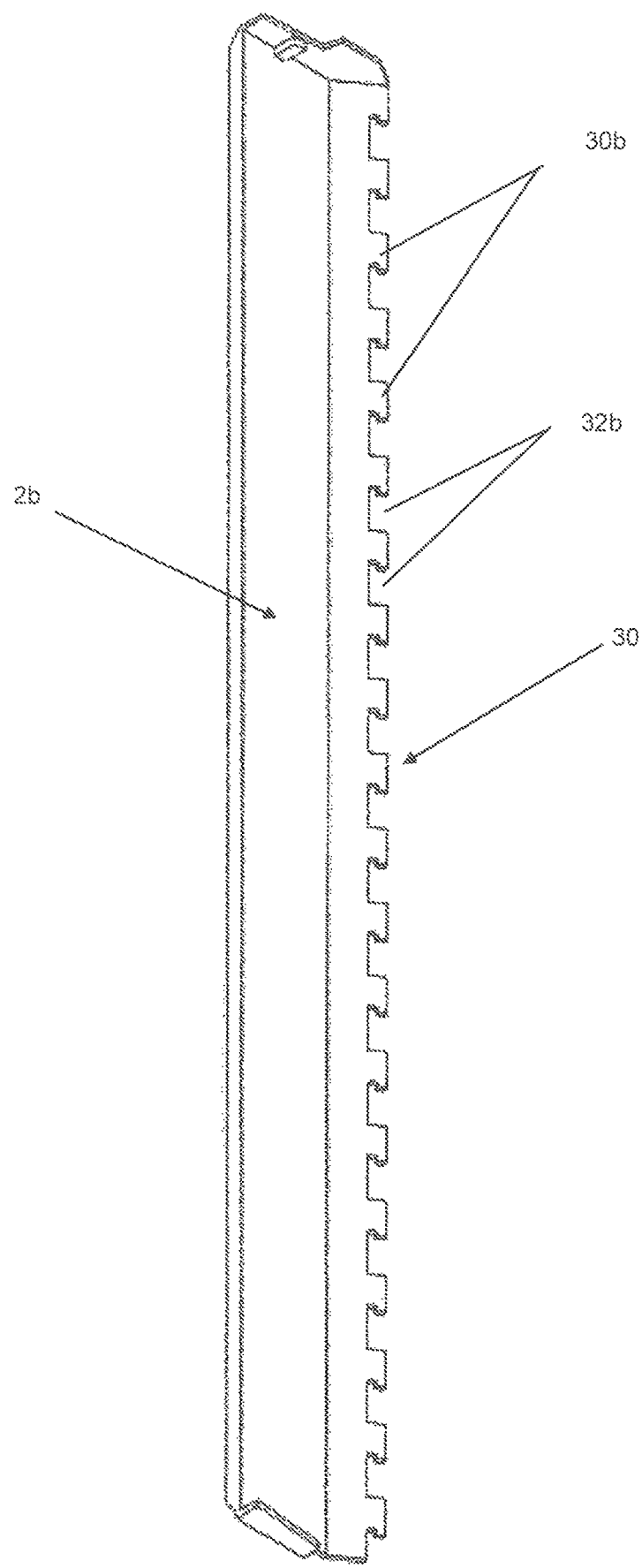

FIG. 3*b* is a 3-dimensional view of the outer side of the second housing section of the apparatus of FIG. 1.

Figure 4:
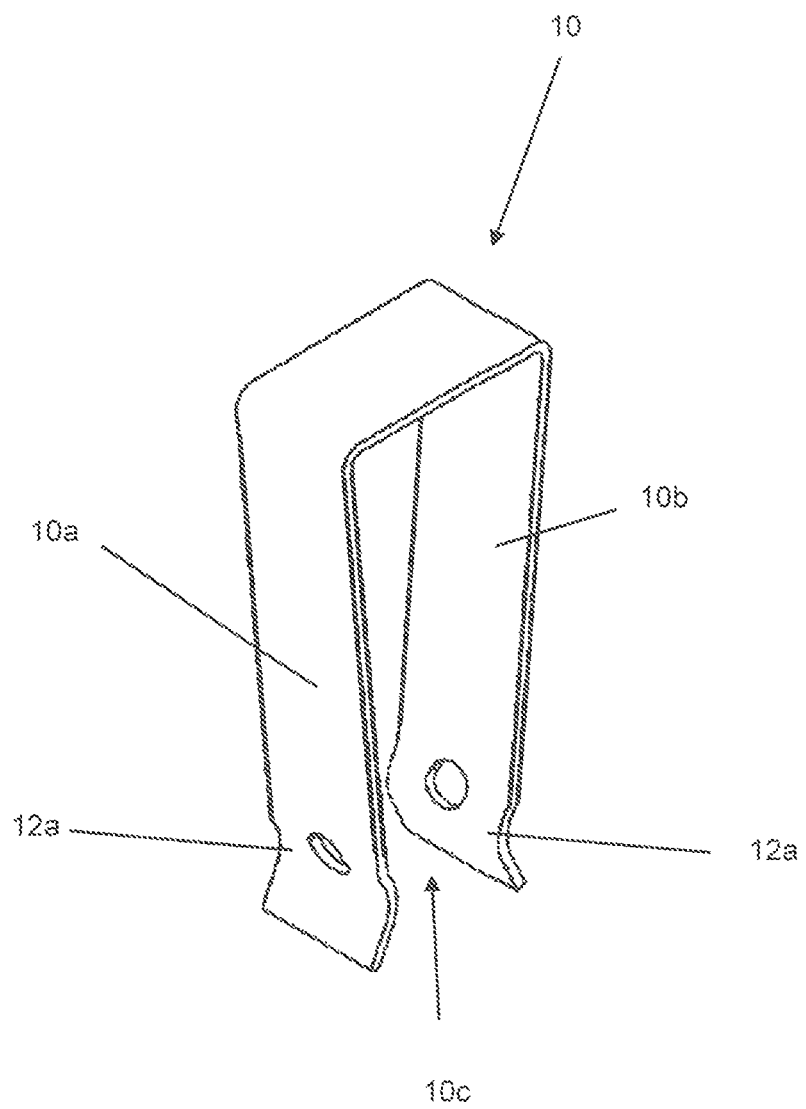

FIG. 4 is a 3-dimensional view of a preferred embodiment of a resilient bracket in accordance with the disclosure.

Figure 5A:
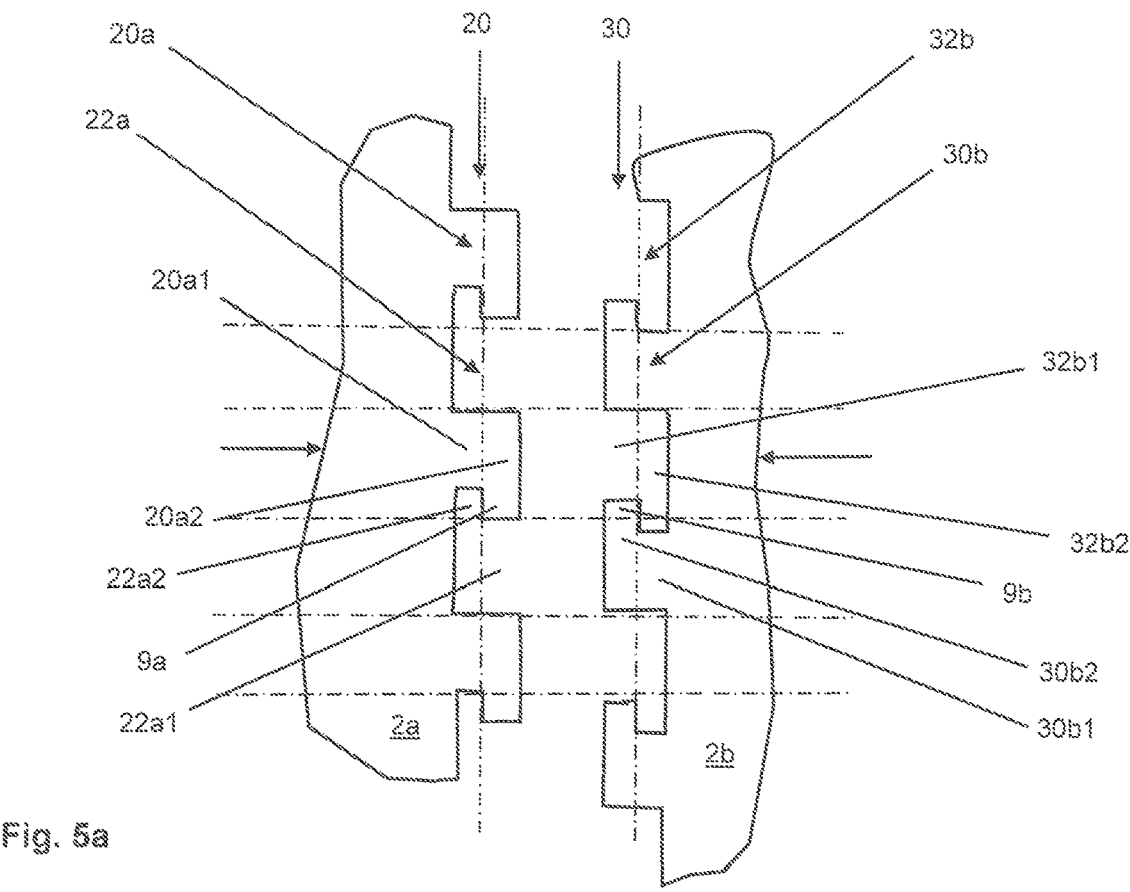

FIG. 5*a* is a partial top view of the first and second engagement elements before engaging the same with each other, in accordance with the disclosure.

Figure 5B:
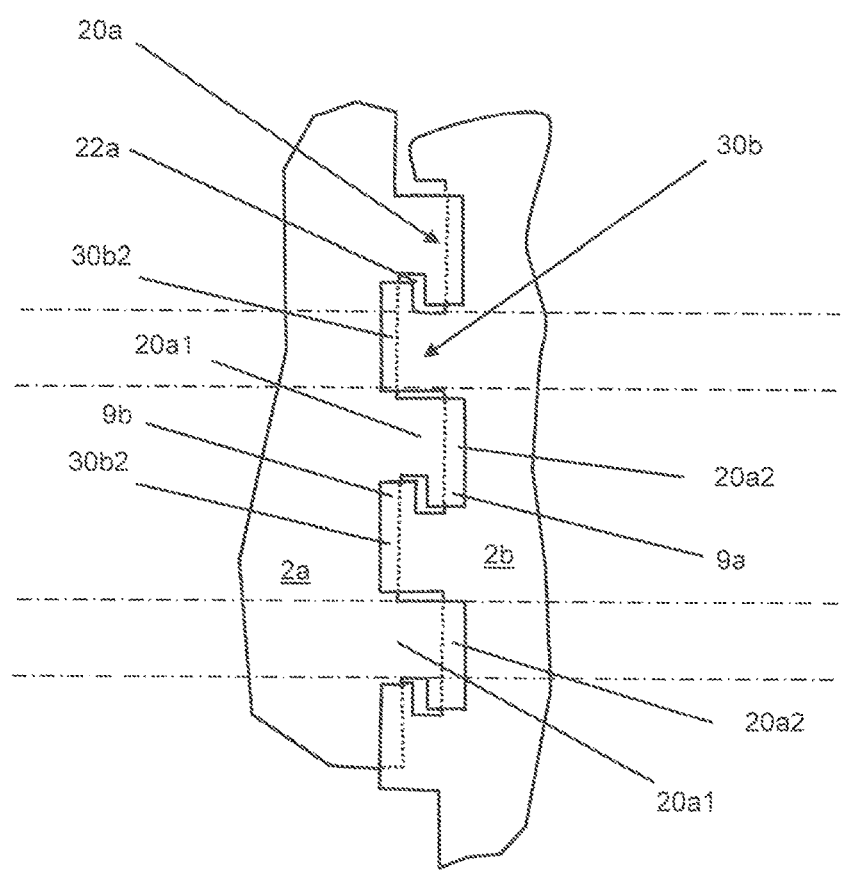

FIG. 5*b* is a partial top view of the first and second engagement elements after engaging the same, in accordance with the disclosure.

DETAILED DESCRIPTION OF THE INVENTION

Figure 2:
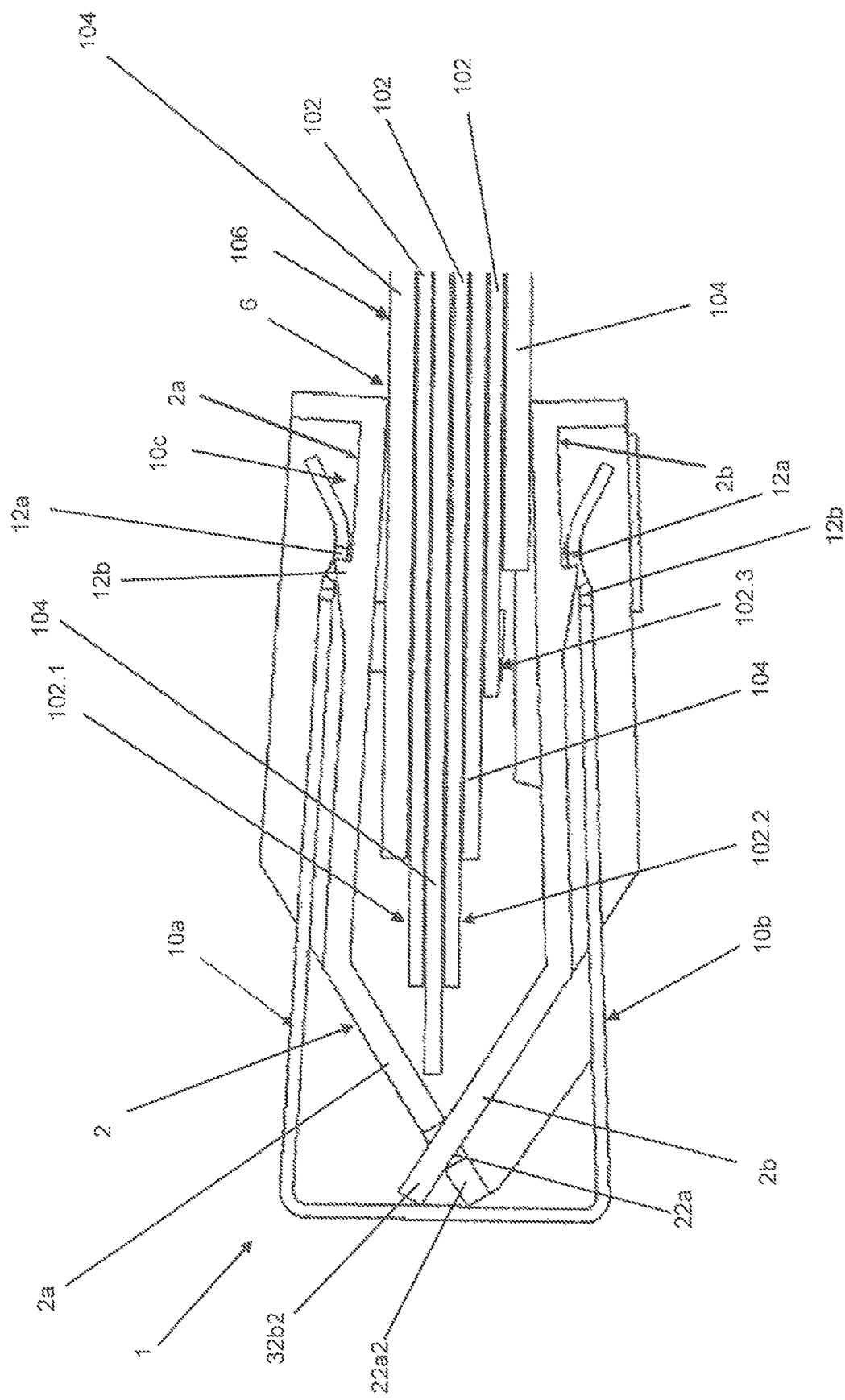
FIG. 2 is a cross sectional view of the apparatus of FIG. 1 along a plane extending through one of the brackets.

As it is shown in FIGS. 1 and 2, a laminated multi-phase busbar 100 comprises a plurality of conducting layers 102 and insulating layers 104 which are arranged between the conducting layers 102. The conducting layers 102 of the laminated multi-phase busbar 100 which may be accommodated in a first switch gear cabinet (not shown) project from the insulating layers 104 and form a lateral connecting portion 106 with contact surfaces 102.1 to 102.3, to which an electric power supply (not shown) or a further busbar 100 may be connected.

In order to electrically insulate the lateral connecting portion 106 of the busbar 100, an apparatus 1 which is shown in FIGS. 1 to 5 comprises an elongated housing 2 which includes a first and a second housing section 2*a*, 2*b* made of an electrically insulating material, in particular plastics. The two housing sections 2a and 2b are pivotally connected to each other along a hinge section 4, which is indicated in FIG. 1 by the dashed dotted line and which extends in a longitudinal direction of the housing 2. An opening 6 is arranged opposite to the longitudinal hinge section 4 which receives the connecting portion 106 of the busbar 100, as it is indicated in FIG. 1.

As it can be best seen from FIGS. 1, 3a, 3b and 5a, the first housing section 2a comprises a plurality of first engagement means 20, and the second housing section 2b comprises a plurality of second engagement means 30 which are complementary to the first engagement means 20 and which are adapted to engage with the first engagement means 20 when pivoting the housing sections 2a, 2b towards each other from a first assembling position (FIG. 5b) to a second clamping position (FIG. 1 and FIG. 2).

The apparatus 1 further includes a preferably U-shaped resilient bracket 10 which is shown in FIGS. 1, 2 and 4 and which comprises a first and a second leg 10a, 10b and an opening 10c that is arranged between the first and second leg 10a, 10b. The first and second leg 10a, 10b and the opening 10c of the bracket 10 are adapted to be positioned over the peripheral surface of the first and second housing sections 2a, 2b in the second engaging position, in which the first and second legs 10a and 10b urge the two housing sections 2a, 2b towards each other, thereby clamping the inner parts of the first and second housing sections 2a, 2b to the periphery of the busbar 100 which is to be electrically insulated.

As it is further shown in FIGS. 3a, 3b and 5a, 5b, the first engagement means 20 comprise a plurality of first engagement elements 20a which are equidistantly spaced along the longitudinal hinge section 4 at the first housing section 2a and which are separated by first cut-outs 22a. The second engagement means 30 comprise a plurality of second engagement elements 30b which are equidistantly spaced along the longitudinal hinge section 4 at the second housing section 2b and which are separated by second cut-outs 32b.

Each of the first engagement elements 20a comprises a first constricted neck portion 20a1 (FIG. 5a, 5b) which projects in a direction away from the opening 6 which receives the connecting portion 106 of the busbar 100 and a first extended head portion 20a2 which is formed thereat. Each of the first cut-outs 22a comprises a first extended head section 22a2 which is arranged adjacent to the first constricted neck portion 20a1 and a first constricted neck section 22a1 which is located adjacent the first extended head portion 20a2, as it is shown in FIGS. 5a and 5b. As it can be seen from FIG. 5a, each of the first and second neck sections 22a1 and 22a2 of the first cut-outs 22a extends from a preferably straight rear edge of an adjoining first engagement element 20a to the constricted neck portion 20a1 and extended head portion 20a2 of a first engagement element 20a, thereby forming the shown L-type contour of the first cut-outs 22a.

Moreover, as it is further shown in FIGS. 5a and 5b, each of the second engagement elements 30b comprises a second constricted neck portion 30b1 projecting in a direction away from the opening 6 and a second extended head portion 30b2 formed thereat. In a similar way, each of the second cut-outs 32b comprises a second extended head section 32b2 which is positioned adjacent to the second constricted neck portion 30b1, and also comprises a second constricted neck section 32b1 that is located adjacent to the first extended head portion 30b2. As it can be seen from FIG. 5a, each of the first and second neck sections 32b1 and 32b2 of the second cut-outs 32b extends from a preferably straight rear edge of an adjoining second engagement element 30b to the constricted neck portion 30b1 and extended head portion 30b2 of a second engagement element 30b, respectively, thereby forming the shown L-type contour of the second cut-outs 32b.

In order to easily engage the engagement elements 20a arranged at the first housing section 2a with the second complementary engagement elements 2b of the second housing section 2b, the width of the first constricted neck portions 20a1 of the first engagement elements 20a is smaller than the width of said second constricted neck sections 32b1 of the second cut-outs 32b point. In addition here to, the width of the second constricted neck portions 30b1 of the second engagement elements 30b is smaller than the width of the first constricted neck sections 22a1 of the first cut-outs 22a, as it is indicated in FIGS. 5a and 5b by the dash dotted lines.

As it can be seen from FIGS. 5a and 5b, each of the first and second extended head portions 20a2, 30b2 comprises a nose-type projection 9a, 9b. The orientation of the nose-type projections 9a, 9b is such that the projections 9a which are formed at the first extended head portions 20a2 of the first engagement elements 20a extend in a direction which is parallel and opposite to the nose-type projections 9b which are formed at the second extended head portions 30b2 of the second engagement elements 30b.

This however provides for the advantage, that the first and second housing sections 2a, 2b can be manufactured as identical parts in one and the same mold and can be assembled to the final housing 2 by simply turning one part upside down relative to the other complementary part before engaging the first and second engagement means 20, 30. Moreover, the first and second nose-type projections 9a, 9b abutting each other in the second clamping position of the apparatus 1 (comp. FIG. 1) provide for an increased flexibility of the hinge section 4.

As it is further shown in FIGS. 2 and 2 and 3a, opposing grooves 40 may be formed on the peripheral surfaces of the first and second housing section 2a, 2b for receiving the legs 10a, 10b of the resilient bracket 10.

In order to prevent the legs 10a, 10b from slipping out of the grooves 8, complementary locking elements in form of hooks, preferably barbs 12b, may be formed inside the grooves 8, which engage with associated openings 12a formed at the legs 10a, 10b of each bracket 10 after moving a bracket 10 into a desired end position on the periphery of the housing 2. However, it is also conceivable to provide the hooks at the legs 10a, 10b of the brackets 10 and openings, or alternatively ridges (not shown), inside the grooves 8. As it is further shown in FIG. 1, one pair of grooves 8 for receiving an associated resilient bracket 10 may also be provided at the top and at the bottom of the housing 2, with the grooves 8 extending in a vertical direction parallel to the imaginary axis (FIG. 1) extending along the hinge section 4 of the mounted apparatus 1. These additional grooves and resilient brackets 10 allow for an improved stability of the apparatus 1 when it is mounted at the busbar 100.

Eventually, further locking elements like jaws or the like (not shown) may be provided at the inner surface of the first and/or second housing section 2a, 2b. These further locking elements are adapted to interact with a connecting portion 106 of a busbar, in order to provide for additional friction or even a form locking interaction which prevent the housing from slipping off the connecting portion 106 after mounting the housing 2 to the busbar 100.

In one embodiment, opposite to the longitudinal hinge section, an opening is provided between the two housing sections which is adapted to receive the connecting portion of a laminated multi-phase busbar, so that the housing functions as an insulating cover which entirely covers the terminals located in the connecting portion of a busbar when applying an electric voltage to the different conducting layers of the busbar.

In order to provide for the hinge portion and allow the first and second housing section to be mounted together and to be adapted to the thickness of a busbar, which might vary due to the number and thickness of the conducting layers used, the first housing section comprises a plurality of first engagement means and the second housing section comprises a plurality of second complementary engagement means which are adapted to engage with the first engagement means when pivoting the first and second housing section towards each other from a first assembling position to a second clamping position. In the first assembling position, in which the first and second housing sections are opened up in a rather linear configuration, comparable to an open book, the first engagement means of the first housing section and the second engagement means of the second housing section can be moved above and into each other. After connecting the engagement means of first and second housing sections to each other, so that they form a hinge which extends along the hinge section of the housing, both housing sections are pivoted about an imaginary axis towards each other which axis extends in a direction that is parallel to the lateral edge of the connecting portion of a busbar.

The apparatus further comprises a resilient, preferably U-shaped or V-shaped bracket which has a first and a second leg and an opening that is arranged between the first and second leg. The first and second legs of the resilient bracket have a length and distance to each other which allows them to be positioned over the peripheral surface of the first and second housing section of the housing after both housing sections have been pivoted around the afore mentioned imaginary axis against the peripheral surface and components which are located in the connecting portion on either side of the lateral connecting portion of the busbar. In this second clamping position, in which the first and second housing sections are firmly mechanically connected to each other in the direction of the pivot axis, thereby forming the hinge section, the connecting portion of the busbar extends through the opening opposite of the hinge section, and the first and second leg of the resilient bracket apply a biasing force to the peripheral surfaces of the first and second housing section which urges the housing sections towards each other, thereby clamping the housing to the connecting portion of the busbar. Though the resilient bracket may be formed of any suitable resilient plastics material like polyamide or the like, the material used is preferably metal, e.g. spring steel or stainless steel, because the electrical insulation is provided by the insulating material of the first and second housing sections against which the legs of the bracket abut.

The apparatus has the advantage that it can be manufactured at low costs, e.g. by heat molding a sheet molding compound or by injection molding, and is easy to assemble and mountable to a busbar. Due to the resilient bracket and the long travel of the resilient legs, the apparatus reliably clamps to the connecting portions of busbars of varying thicknesses without the need of a time-consuming adjustments of clamping screws or the like. Another advantage of the apparatus according to the invention can be seen in that temperature variations of the ambient air do not significantly affect the magnitude of the clamping force, and as desired number of brackets, e.g. 2 or more brackets, can be mounted side by side at the front side of the apparatus, in order to provide for a sufficient clamping force when mounting the apparatus to large busbars.

According to another object of the invention, the first engagement means comprise a plurality of first engagement elements which are preferably equidistantly spaced along the longitudinal hinge section at the first housing section. The first engagement elements are separated by first cut-outs, wherein all of the cut-outs do preferably have an identical or at least substantially identical shape. In a similar manner, the second engagement means comprise a plurality of second engagement elements which are equidistantly spaced along the longitudinal hinge section which is provided at the second housing section. In the same way as the first engagement elements, also the second engagement elements have a preferably identical shape and are separated by intermediate second cut-outs as described herein before with regard to the first engagement elements.

Preferably, each of the first engagement elements comprises a first constricted neck portion which projects in a direction away from the opening which receives the connecting portions of the laminated busbar and a first extended head portion which is formed at the constricted neck portion.

In this embodiment, each of the first cut-outs comprises a first extended head section which is located adjacent to the first constricted neck portion, and a first constricted neck section which is located adjacent to the first extended head portion.

Moreover, each of the second engagement elements preferably comprises a second constricted neck portion which projects in a direction away from the opening and a second extended head portion which is formed at the second constricted neck portion. Each of the second cut-outs comprises a second extended head section which is located adjacent to the second constricted neck portion and a second constricted neck section which is located adjacent the first extended head portion.

In a most preferred embodiment of the invention which provides for a very easy and fast assembling of the apparatus, the width of the first constricted neck portions of the first engagement elements is smaller than the width of the second constricted neck sections of the second cut-outs. Moreover, the width of the second constricted neck portions of the second engagement elements is smaller than the width of the first constricted neck sections of the first cut-outs. This layout of the first and second engagement elements provides for the advantage that the first and second housing sections can be joined together by simply inserting the first constricted neck portions of the first housing section into the corresponding second constricted neck sections of the cut-outs formed at the second housing section and vice versa while holding the first and the second housing sections in the V-shaped configuration. After the insertion of the constricted neck portions into the associated neck sections of the cut-outs (openings), the first and the second housing sections can be pivoted towards each other in order to constitute the hinge which extends along the longitudinal hinge section.

According to a further object of the invention, each of the first and second extended head portions of the afore-described embodiment may comprise a nose-type projection. The nose-type projections which are formed at the first extended head portions of the first engagement elements extend in a direction which is preferably parallel and opposite to the direction of nose-type projections of the second extended head portions which are formed at the second engagement elements.

This construction provides for the advantage that the first and second housing section may be formed as identical parts which are assembled upside down, in order to provide for the housing of the apparatus which serves as a protective cover for the end portions of the busbar. As a result, the production costs for an additional mold may be saved.

According to a further aspect of the present invention, opposing grooves may be provided on the peripheral surfaces of the first and second housing section. These opposing grooves are adapted to receive the legs of the resilient bracket, thereby safely holding the brackets in place when mounting them on the outer periphery of the first and second housing sections.

In this embodiment of the invention complementary locking elements, in particular hooks and openings for receiving the hooks or hooks and ridges, may be advantageously provided at the first and second leg of each resilient bracket and in the associated grooves for receiving the legs of the brackets, in order to prevent the brackets from slipping off the peripheral surface of the housing in a direction perpendicular to the direction of the pivotal axis extending along the hinge portion.

According to another aspect of the invention further locking elements may be provided at the inner surface of the first and/or second housing section. These further locking elements are preferably adapted to mechanically interact with an associated connecting portion of a laminated multi-phase busbar, in order to prevent the housing from slipping off a lateral connecting portion after mounting the housing to the lateral connecting portion of the laminated multi-phase busbar.

LISTING OF REFERENCE NUMERALS 1 apparatus
2 housing
2a first housing section
2b second housing section
4 hinge section
6 opening for receiving connecting portion of busbar
8 grooves in periphery of housing sections
9a, 9b nose-type projection
10 resilient bracket
10a first leg of resilient bracket
10b second leg of resilient bracket
10c opening of resilient bracket
12a, b complementary locking elements
20 first engagement means
20a first engagement elements
20a1 constricted neck portion of first engagement elements
20a2 extended head portion of first engagement elements
22a first cut-outs between first engagement elements
22a1 constricted neck section of first cut-outs
22a2 extended head section of first cut-outs
30 second engagement means
30b second engagement elements
30b1 constricted neck portion of second engagement elements
30b2 extended head portion of second engagement elements
32b second cut-outs between second engagement elements
32b1 constricted neck section of second cut-outs
32b2 extended head section of second cut-outs
100 laminated multi-phase busbar
102 conducting layers
102.1 contact surface
102.2 contact surface
102.3 contact surface
104 insulating layers
106 lateral connecting portion All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for electrically insulating a lateral connecting portion of a laminated multi-phase busbar comprising:

an elongated housing having a first and a second housing section made of an electrically insulating material which are pivotally connected to each other along a hinge section extending in a longitudinal direction of said housing and an opening arranged opposite to said longitudinal hinge section for receiving a connecting portion of a laminated multi-phase busbar;

wherein said first housing section comprises a plurality of first engagement structures and said second housing section comprises a plurality of second complementary engagement structures, which are adapted to engage with said first engagement means when pivoting said first and second housing section towards each other from a first assembling position to a second clamping position;

a resilient bracket having a first and a second leg and an opening arranged between said first and second leg, said first and second leg and said opening of said bracket being adapted to be positioned over the peripheral surface of said first and second housing section in said second engaging position for urging said first and second housing section towards each other.

2. The apparatus according to claim 1, wherein said first engagement structures comprise a plurality of first engagement elements which are equidistantly spaced along said longitudinal hinge section at said first housing section and which are separated by first cut-outs, and that said second engagement means comprise a plurality of second engagement elements which are equidistantly spaced along said longitudinal hinge section at said second housing section and which are separated by second cut-outs.

3. The apparatus according to claim 2, wherein each of said first engagement elements comprises a first constricted neck portion projecting in a direction away from said opening and a first extended head portion formed thereat, and in that each of said first cut-outs comprises a first extended head section adjacent to said first constricted neck portion and a first constricted neck section adjacent said first extended head portion.

4. The apparatus according to claim 2, wherein said second engagement elements comprises a second constricted neck portion projecting in a direction away from said opening and a second extended head portion formed thereat, and in that each of said second cut-outs comprises a second extended head section adjacent to said second constricted neck portion and a second constricted neck section adjacent said first extended head portion.

5. The apparatus according to claim 3, wherein the width of said first constricted neck portions of said first engagement elements is smaller than the width of said second constricted neck sections of said second cut-outs and that the width of said second constricted neck portions of said second engagement elements is smaller than the width of said first constricted neck sections of said first cut-outs.

6. The apparatus according to claim 3, wherein each of said first and second extended head portions comprises a nose-type projection, wherein said nose-type projections formed at said first extended head portions of said first engagement elements extend in a direction parallel and opposite to said nose-type projections of said second extended head portions which are formed at said second engagement elements.

7. The apparatus according to claim 1, wherein said first and second housing sections are identical.

8. The apparatus according to claim 1, wherein opposing grooves are formed on the peripheral surfaces of the first and second housing section for receiving the legs of the resilient bracket.

9. The apparatus according to claim 8, wherein complementary locking elements, in particular hooks and openings for receiving the hooks or hooks and ridges, are provided at said legs of said resilient bracket and at said associated grooves, for preventing the bracket from slipping off the peripheral surface of said housing.

10. The apparatus according to claim 1, wherein further locking elements are provided at the inner surface of said first and/or second housing section, said further locking elements being adapted to interact with a connecting portion of a laminated multi-phase busbar, to prevent said housing from slipping off a lateral connecting portion after mounting the housing to said lateral connecting portion.

* * * * *